March 29, 1949.    F. J. OLENDER    2,465,744
FISHING ROD
Filed March 22, 1947
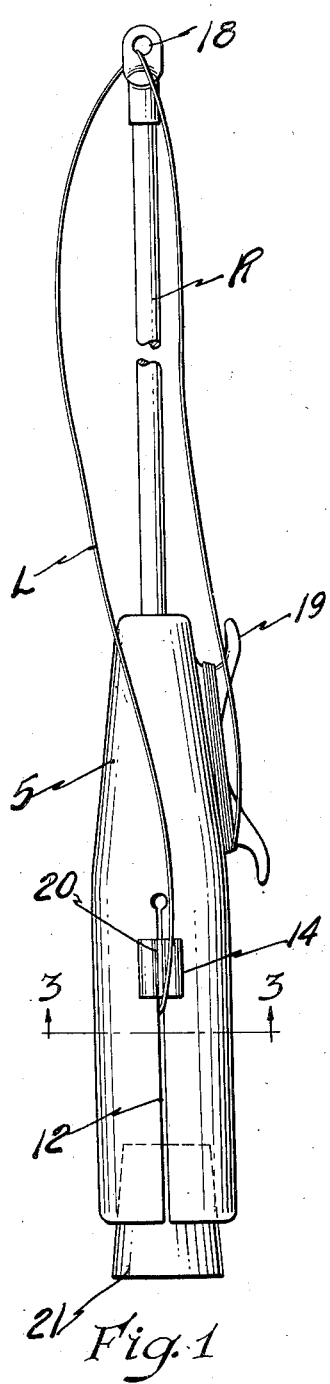
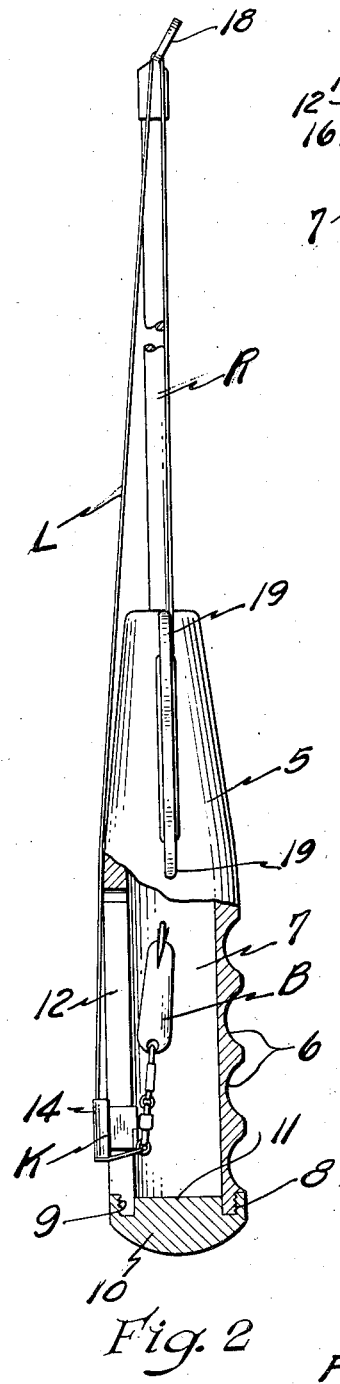
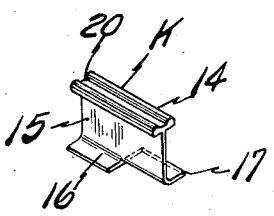
INVENTOR.
Frank J. Olender.
BY
Frank C. Learman,
ATTORNEY Patented Mar. 29, 1949

2,465,744

UNITED STATES PATENT OFFICE 2,465,744

FISHING ROD

Frank J. Olender, Saginaw, Mich.

Application March 22, 1947, Serial No. 736,540

5 Claims. (Cl. 43—18)

This invention relates to fishing rods and more particularly to means for housing the bait and tensioning the line when the rod is being carried or stored.

One of the prime objects of the invention is to design a fishing rod handle having an open end bait container formed integral therewith, and into which the bait can be readily placed, thus eliminating the possibility of its becoming accidentally entangled in a fisherman's clothing or other objects; eliminating the possibility of damage to the hooks or lures when such hooks or lures are free and lie on ice, the bottom of a boat, dock, or other support where they can be readily crushed by stepping or dropping heavy objects thereon.

Another object of the present invention is to provide a combination handle and bait compartment including means for tensioning the line when the bait is in the compartment, so that it remains taut when not in use, preventing it from becoming entangled in brush, trees, or other matter when the fisherman is walking, or with other articles when stored in an automobile, cabinet, or other place.

A further object is to design a fishing rod especially adaptable for ice fishing in cold weather, the general design being such that the bait compartment is readily openable for receiving or removal of the bait, and the tensioning means being designed so that it is readily operable by a person wearing mittens or gloves, although it will be readily understood that the invention is equally adaptable for warm weather fishing of all kinds.

A further object still is to design a handle that fits the hand and forms an easy firm grip, and which can be of any desired shape and design.

Still a further object is to provide a fishing rod handle that can be formed of wood, plastic, metal or any other desired material.

A further object still is to provide a fishing rod of simple construction, which is durable, reliable, and efficient, and which can be easily and inexpensively manufactured and assembled.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a side-elevational view of a fishing rod constructed in accordance with my invention, the line being shown slack.

Fig. 2 is a part-sectional, elevational view showing the bait compartment with the bait therein and the line tensioned, the stopper member being omitted, and showing an alternate construction in which a screw plug forms the closure for the end of the bait compartment.

Fig. 3 is a transverse, sectional view taken on the line 3—3 of Fig. 1.

Fig. 4 is an isometric view of the resilient keeper member.

Referring now to the drawing in which I have shown a handle 5 that can be formed of any desired material, finger grooves 6 being formed in the handle to provide a firm grip, and the handle is further bored as at 7 to provide a bait compartment in which a bait "B" is stored and as will be hereinafter more fully described.

The bored end of the handle 5 is open as shown and is shouldered and threaded as at 8 to accommodate the threaded section 9 of the cap 10 which forms a closure for said open end.

A longitudinally disposed slit 12 is provided in the handle 5 in alignment with the longitudinal axis of the handle, and a keeper "K" is slidably mounted therein, said keeper comprising a thumb-rest 14 formed with a web 15 which is slidable in said slit, and opposed, resilient wings 16 and 17 are formed integral with said web, said wings frictionally engaging the wall of the compartment so that the keeper remains in set position.

A rod "R" is mounted in the handle in the conventional manner, and an eye 18 is provided on the outer end thereof, spool arms 19 being provided on the side of the handle and on which the line "L" is wound, said line leading through the eye 18 and having the bait "B" attached thereto, and when the bait is not in use, it is stored in the bait compartment, the line lying in the groove 20 provided in the thumb-rest 14 and thence leading through the slit 12 as indicated in Fig. 1 of the drawing.

When it is desired to tension the line, the bait "B" is first placed in the bait compartment (the line being sufficiently slack to permit); under such conditions the keeper "K" will be located at the upper end of the slit 12 as shown in Fig. 1 of the drawing and the line "L" will lead over the keeper "K," lying in the groove 20; then by sliding the keeper "K" downwardly to position shown in Fig. 2, the line will be tensioned accordingly.

To release, the operation is reversed; the keeper "K" is forced to the upper end of the slit, so that the line will be slack, and the cap 8 is unscrewed and the bait removed. If necessary, one loop of line can be unwound from the spool "S" so that sufficient line is provided to permit easy removal of the bait.

In Fig. 1 of the drawing I have shown a modified closure means, comprising a cork or stopper 21 which fits the open end of the bait compartment; no threading is necessary, and the construction is otherwise the same.

In cold weather, it is not necessary to remove gloves or mittens to free the bait; merely push the keeper to the upper end of the slit, unscrew or remove the cap or plug, and the bait is freely removable, after which the necessary line in unwound and the fishing line is ready for use.

It will, of course, be understood that the spool arms 19 may be formed integral with or separate from the handle, and any other desired winding means may be employed without departing from the spirit of the invention.

From the foregoing description, it will be obvious that I have perfected a very simple, practical and convenient fishing rod.

What I claim is:

1. A fishing rod including an elongated handle, hollow to form an open bait compartment, a slit in said handle on a plane parallel to the axis thereof, a keeper slidable in said slit, and a cap forming a closure for the open end of the bait compartment.

2. The construction as set forth in claim 1 in which the keeper has frictional engagement with the walls of the compartment for holding it in set position.

3. The construction as defined in claim 1 which includes a rod in the handle and having an eye on the outer end thereof, and a line threaded through said eye and trained over said keeper, said line being tensioned by outward movement of the keeper in said slit.

4. A fishing rod including an elongated handle having a rod connected thereto, an eye on the end of the rod, a line wound on the handle and leading through said eye, a bait compartment in said handle, a slit in said handle and open to the bait compartment, a keeper slidably and adjustably mounted in said slit and over which a fishing line is trained for tensioning said line when the keeper is adjusted, and a cap forming a closure for said compartment.

5. The combination as defined in claim 4 in which the face of the keeper is longitudinally grooved to accommodate a fishing line.

FRANK J. OLENDER.

REFERENCES CITED

The following references are of record in the file of this patent:

UNITED STATES PATENTS

| Number | Name | Date |
|---|---|---|
| 475,852 | Edgerly | May 31, 1892 |
| 798,507 | Hally | Aug. 29, 1905 |
| 2,117,407 | Davis | May 17, 1938 |
| 2,180,323 | Maxwell | Nov. 14, 1939 |
| 2,239,852 | Gunnufson | Apr. 22, 1941 |